No. 687,833. Patented Dec. 3, 1901.
P. E. FRANCKEN.
BATTERY.
(Application filed July 25, 1900.)
(No Model.)
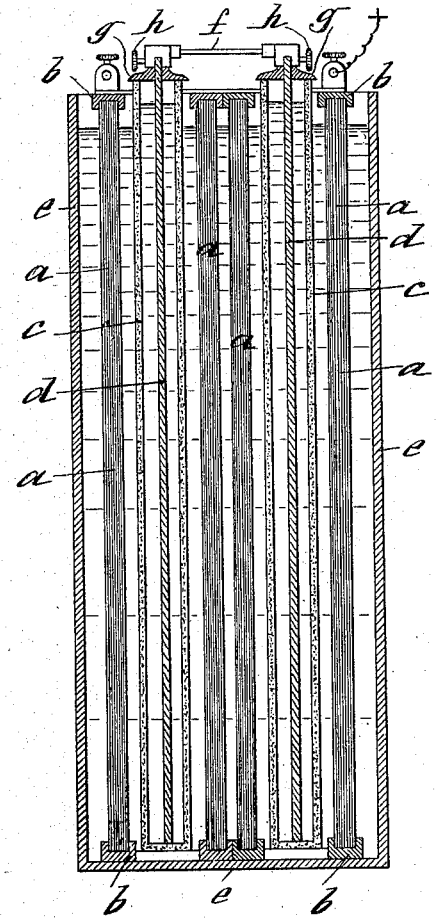
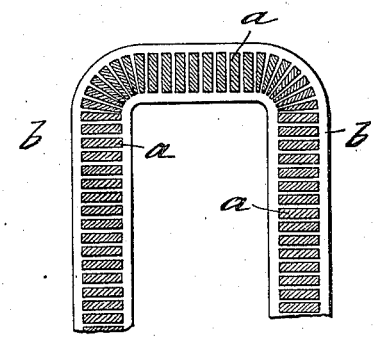
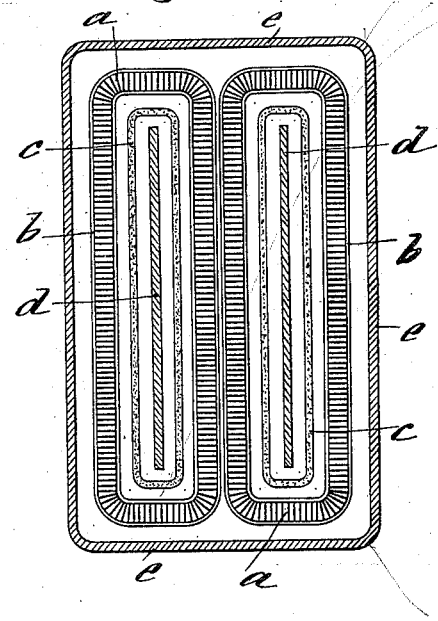
Witnesses:
Jno. R. Adams
Harold Lewis
Inventor:
Paul Emile Francken
By Knight Bros.
Attys

UNITED STATES PATENT OFFICE.

PAUL EMILE FRANCKEN, OF BRUSSELS, BELGIUM.

BATTERY.

SPECIFICATION forming part of Letters Patent No. 687,833, dated December 3, 1901.

Application filed July 25, 1900. Serial No. 24,834. (No model.)

*To all whom it may concern:*

Be it known that I, PAUL EMILE FRANCKEN, a subject of the King of Belgium, and a resident of Brussels, in the Kingdom of Belgium, have invented certain new and useful Improvements in Constant Batteries, of which the following is a specification.

The increased output or yield obtained by means of the constant battery which forms the object of the present invention is due both to its construction in compartments and to the configuration of the carbon negative pole in combination with an exciting liquid and a depolarizer of such nature and densities as are most favorable for generating current.

The improved battery is illustrated, by way of example, in the accompanying drawings, in which—

Figure 1 is a vertical section, and Fig. 2 is a transverse section, of the battery; and Fig. 3 shows a part of the carbon pole, on an enlarged scale, in transverse section.

The surface of the carbon pole is much extended, owing to its being constructed of very thin plates of carbon $a$, which at the two ends—that is, at the top and bottom—are set into lead sockets $b$ as near together as possible without touching one another. The ends of the carbon plates have previously received by electrolytic means a coating of copper alloyed subsequently with a precious metal in order to increase their conductivity. The basal conformation of the lead sockets $b$ determines the form of the carbon arranged in the compartments, said form being of the greatest importance for obtaining the generating action of the battery. For this the rectangular form has been found the most suitable. The outer cell $e$, containing the carbon $a$, and the porous vessel $c$, of terra-cotta or earthenware, occupying the space inside the carbon and holding the zinc plate $d$, are likewise rectangular. It is evident that owing to this rectangular casing of the various parts the generating action sets up from all points at equal and proximate distances and in liquid media of the same thickness, so that they develop the maximum yield at all points of the battery elements, which is not the case in cylindrical cells, for instance, where the strongest action develops toward the center and continues with diminishing force toward the perimeter in consequence of the unavoidable inequality of the layers of liquid which separate them. This inequality, moreover, necessitates the employment of larger outer cells than are otherwise requisite, while with rectangular cells the outer vessel $e$ is hardly any larger than the carbon itself—that is, its dimensions are only increased by the thickness of the necessary layer of liquid surrounding the carbon.

The rectangular section or frame-like form of the negative pole is not the only reason for its adoption. The chief reason lies in the fact that this form permits of its receiving a very large number of thin carbon plates $a$, and this number may be increased twenty per cent. when the plates are placed at right angles to the four sides of the sockets, as shown in the drawings, instead of giving them the oblique position generally used with circular sockets. In accordance with this arrangement one hundred plates can be placed in the sockets or frames of equal size, while by placing them obliquely only eighty plates at the most could be inserted, so that placing the plates at right angles increases the active surface, and consequently the output, twenty per cent. The exciting liquid contained in the porous cell $c$ is sulfuric acid diluted, preferably, to 15° Baumé, and the depolarizing liquid contained in the outer cell $e$ is bichromate-of-soda solution preferably at 30° Baumé, these densities having given the best results. The rectangular form of the batteries has, moreover, the advantage of allowing the better utilization of two cells in one outer vessel, as illustrated in the present examples. In this case the cells are connected in series or in groups, as preferred, by strips of lead soldered in a corresponding manner on the sockets $b$ and by joining the terminals of the zinc plates by means of copper rods $f$. The zinc plates are kept in the center of the porous cells by means of flaps passed through slots in the ebonite cross-pieces $g$, resting on the cells and themselves supported by screwing the screws $h$ of the terminals on the zinc pieces.

Owing to the construction of the battery-cells described above there is attained in the first place a much larger active surface in consequence of placing the carbon plates at right angles and for equal surfaces a greater development of electric current with a smaller battery than with any battery hitherto known. This battery is consequently not only particularly suitable for electric-light installations, but it may also be said that it is the first which allows of these installations, being practically made without their being subject to the disappointments inherent to battery installations up to now.

Having thus described my invention, what I claim as new, and desire to secure by Letters Patent, is—

1. In a constant battery, embodying a carbon electrode and a porous cell, the combination of the porous cell, the rectangular carbon electrode comprising the thin separated carbon plates closely arranged in a rectangular group surrounding and perpendicular to the walls of said porous cell; the porous cell containing a zinc plate and an electrolyte composed of sulfuric acid at 15° Baumé as an exciting liquid and of bichromate-of-soda solution at 30° Baumé as depolarizing liquid, substantially as described.

2. A carbon electrode composed of a rectangular group of separated closely-placed thin carbon plates arranged at right angles to the sides of the rectangle as shown, and sockets between which the two ends of the plates are fixed, whereby the surface of the carbon electrode is increased and consequently the output of the cell enlarged.

3. In a constant battery, a carbon electrode comprising upper and lower rectangular socket-frames and closely-juxtaposed thin carbon plates, disposed vertically between said frames, in planes perpendicular to the sides of the frames, and with their ends secured by the sockets of the frames, for the purpose set forth.

In witness whereof I have hereunto set my hand in presence of two witnesses.

PAUL EMILE FRANCKEN.

Witnesses:
AUG. JOERISSEN,
GREGORY PHELAN.